Oct. 16, 1956        J. P. LOVELY        2,766,595
AIR CONDITIONER
Filed Jan. 4, 1954        2 Sheets-Sheet 2
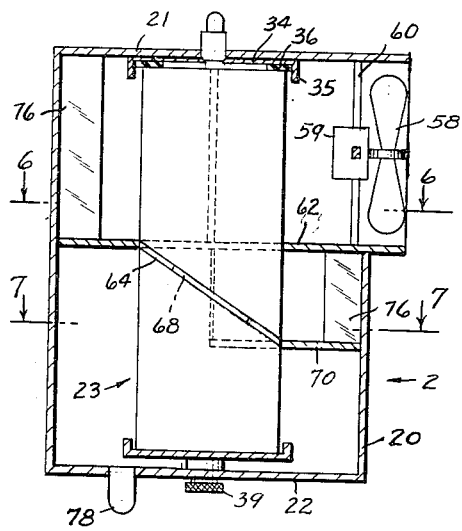
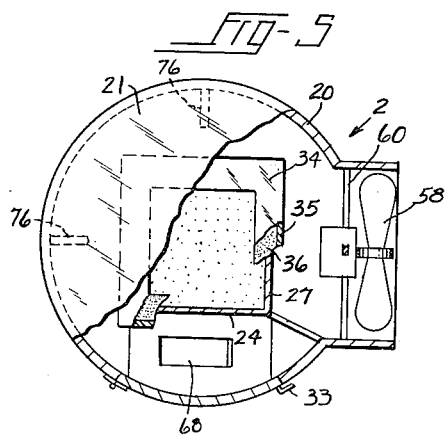
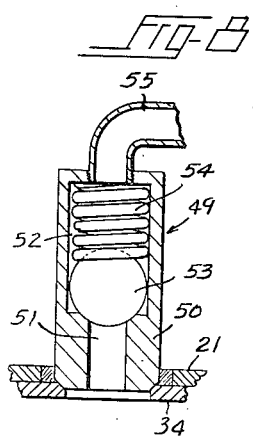
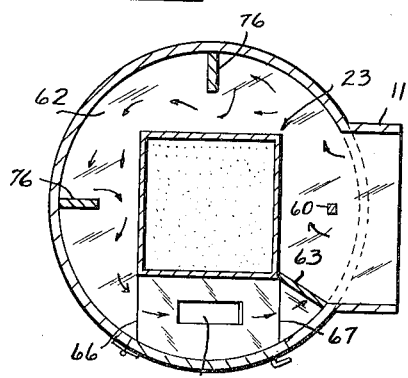
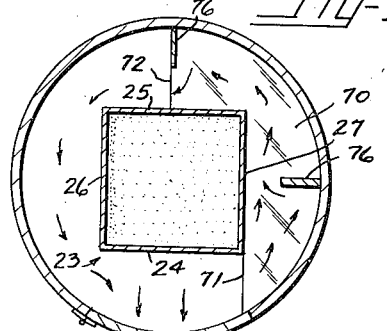
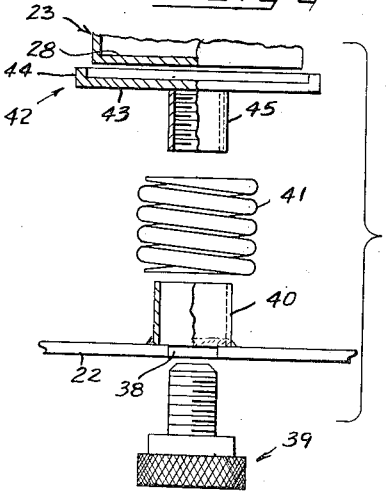
INVENTOR.
JAMES P. LOVELY
BY
Boyken, Mohler & Beckley
ATTORNEYS

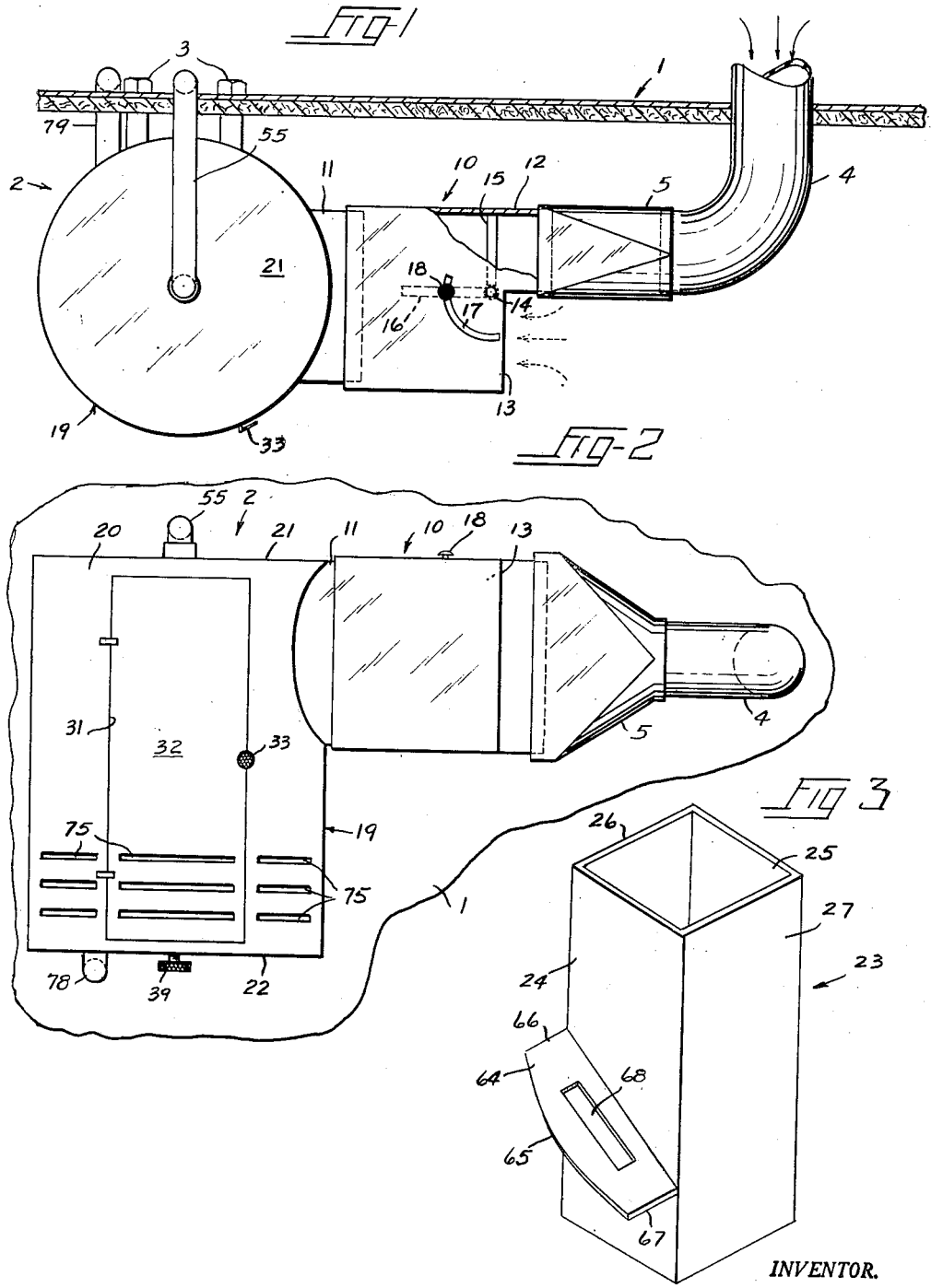

United States Patent Office 2,766,595
Patented Oct. 16, 1956

2,766,595

AIR CONDITIONER

James P. Lovely, San Jose, Calif.

Application January 4, 1954, Serial No. 402,069

4 Claims. (Cl. 62—91.5)

The present invention relates to air conditioners and more particularly to an air conditioner adapted to employ solid carbon dioxide Dry Ice for cooling the interior of an automobile or the like.

In some respects the present invention constitutes an improvement over the air conditioner disclosed in my United States Patent No. 2,082,501, dated June 1, 1937.

The use of Dry Ice for cooling requires frequent replenishing of the Dry Ice and for this reason a convenient means is required to recharge the conditioner. It is therefore one of the objects of the present invention to provide an air conditioner adapted to be employed in an automobile and which conditioner is readily recharged with Dry Ice without any effort by the user and without any danger to him.

Another object of the invention is the provision of means for exhausting the carbon dioxide vapor to the exterior of the automobile so that said vapor does not become entrained in the fresh air passing through the conditioner.

Still another object of the invention is the provision of a more efficient air conditioner for automobiles which is inexpensive to manufacture and economical to operate.

Yet another object of the invention is the provision of a Dry Ice container which is easily inserted into the conditioner and easily withdrawn therefrom and which incorporates means for preventing injury to the operator when handling the same.

Other objects and advantages of the invention will be apparent from the following specification and drawings wherein:

Fig. 1 is a horizontal cross sectional view through an automobile adjacent the fire wall showing the invention in use.

Fig. 2 is a front elevational view of the invention of Fig. 1.

Fig. 3 is a perspective view of the Dry Ice container.

Fig. 4 is a vertical cross sectional view of the conditioner with the inlet ducts removed.

Fig. 5 is a top plan view of the conditioner of Fig. 4 with the cover and other portions broken away to show internal structure.

Fig. 6 is a horizontal cross sectional view through the conditioner as taken along lines 6—6 of Fig. 4.

Fig. 7 is a horizontal cross sectional view through the conditioner as taken along lines 7—7 of Fig. 4.

Fig. 8 is a fragmentary cross sectional view through the cover of the conditioner showing the outlet relief valve in section.

Fig. 9 is an exploded view of the means adjacent the bottom of the conditioner for releasably securing the Dry Ice container in sealed position.

The invention is adapted to be employed in the passenger compartment of an automobile having a firewall generally designated 1 for separating the passenger compartment from the engine compartment. The heat exchange unit or conditioner generally designated 2 may be secured to the firewall 1 by any convenient means such as bolts 3.

Air is fed into the conditioner 2 either from the outside atmosphere or from the passenger compartment itself. In the latter case, the air in the automobile is merely recirculated.

If outside air is furnished, the same may be conducted by any desired type of fresh air conduit (not shown) through an elbow 4 (Figs. 1, 2) extending through the firewall 1. The fresh air is then conducted from elbow 4 through a suitable transition piece 5 to an adapter generally designated 10 (Figs. 1, 2).

The adapter 10 is secured at one end to the inlet 11 and at its opposite end to the transition piece 5. The adapter 10 is generally rectangular and includes a pair of inlets 12, 13 (Fig. 1). Inlet 13 is employed when air is circulated from the passenger compartment through the conditioner, and inlet 12, which is connected to transition piece 5, is employed when fresh air from outside the automobile is to be cooled.

A vertically disposed pivot 14 is provided extending between the top and bottom of adapter 10 and swingably secured therein. Rigidly secured to said pivot 14 are a pair of perpendicularly disposed baffles 15, 16 which are adapted to close inlet 12 and inlet 13 respectively. In the position of Fig. 1 it is seen that the baffle 15 closes inlet 12 against movement of fresh air therethrough while baffle 16 is swung away from inlet 13 permitting passage of air from the interior of the automobile therethrough. When the pivot 14 is swung 90° in a counterclockwise direction from the position of Fig. 1, it is seen that the baffle 16 closes inlet 13 while baffle 15 is swung away from the inlet 12.

In order to permit manual positioning of the baffles 15, 16 an arcuate slot 17 is formed in the top of adapter 10 and a knob 18, rigid with the upper edge of baffle 16, extends through said slot where it is adapted to be grasped by the operator for swinging the baffles to any desired position. It will be noted that baffles 15, 16 may be swung to an intermediate position if desired, in which case fresh outside air will be admitted to the conditioner as well as air from the interior of the automobile.

The conditioner 2 comprises an outer jacket 19 having cylindrical lateral walls 20, a top cover 21 and a bottom 22. The inlet 11 is formed in the lateral walls 20 adjacent the cover 21 (Figs. 4, 5).

Centrally disposed relative to the cylindrical lateral walls 20 is a container generally designated 23 (Fig. 3) which is generally rectangular in shape and having front and rear walls 24, 25, respectively and opposite sidewalls 26, 27. The container is open at its upper end and is closed at its lower end by a bottom 28 (Fig. 9).

The container 23 is adapted to be inserted through a generally rectangular opening 31 in the lateral walls 20 of the conditioner jacket, a hinged door 32 being provided over said opening. A knob 33 may be provided on the door 32 for swinging the latter as desired.

Centrally mounted on the underside of the cover 21 of the jacket is a gasket plate 34 provided with a peripherally extending depending flange 35. Mounted on plate 34 and within flange 35 is a gasket 36 against which the top of container 23 is adapted to abut.

Adjacent the bottom 22 of the jacket 19 is an aperture 38 (Fig. 9) which is adapted to receive therethrough the shank of a bolt 39. Concentric with said aperture 38 is a sleeve 40 which is somewhat larger in diameter than said aperture and which is secured to the bottom 22 in any convenient manner such as welding.

Around the sleeve 40 and concentric therewith is a helical compression spring 41 which bears at its lower end against the upper side of the bottom 22 and bears at its upper end against the underside of a support member 42.

This support member 42 includes a generally rectangular plate 43 provided along three of its four edges with an upstanding flange 44. The front edge of plate 43, that is, the edge adjacent the jacket door 32 is not provided with a flange so that the container 23 may readily be slipped onto said plate through the door 32.

Rigidly secured to the underside of plate 43 is a downwardly extending internally threaded boss 45 which is adapted to threadedly receive therein the shank of bolt 39.

By rotating the bolt 39 into the boss 45 against the resiliency of spring 41 it will be apparent that the support plate 42 is urged downwardly to a position where the Dry Ice container 23 may be inserted through the opening 31 in the lateral walls 20 of the jacket to a position between the gasket 36 and the support member 42. The bolt 39 may then be backed off so that the entire force of spring 41 is brought to bear on the support member 42 thus urging the container 23 upwardly into sealing engagement with the gasket 36. In this sealed position, it will be apparent that escape of carbon dioxide vapor from the container 23 is prevented.

Secured to the cover 21 of the conditioner is a relief valve generally designated 49 (Fig. 8) and including a body 50 through which is provided a vertically extending bore 51 for conducting carbon dioxide vapor into the interior of said body from the container 23. The body 49 is provided with an enlarged chamber 52 for receiving a ball 53 and a helical compression spring 54 for urging said ball against the adjacent end of bore 51. At the end opposite the bore 51 the body 50 is provided with a discharge conduit 55 through which the carbon dioxide escaping from valve 49 is conducted through firewall 1.

In operation, and with reference to Figs. 4, 8, it will be apparent that, upon sublimation of the Dry Ice due to heat transfer between the outside air and the walls of container 23, the pressure of the carbon dioxide vapor will increase to a point sufficient to overcome the urgency of spring 54 thus permitting the escape of said vapor. In this manner, the force of spring 54 may be predetermined so that any desired rate of heat exchange may be effected.

By the present invention means are provided to insure adequate circulation of air along the sidewalls of container 23. For the purpose of positively forcing the air into the conditioner, an axial flow fan 58 is provided in the inlet 11 and driven by an electric motor 59 which, in turn is mounted on the usual spider 60.

Extending transversely across the space between the container 23 and the lateral walls of the jacket 19 is a horizontally disposed baffle 62 (Fig. 6) which is about on a level with the lower side of inlet 11. Alongside the inlet 11 and extending inwardly toward the container 23 is a vertically disposed baffle 63 which extends upwardly from said horizontal baffle 62 to the cover of the conditioner. By this structure the air entering through inlet 11 is constrained to move in a generally counter-clockwise path around the container 23.

Referring again to Fig. 3, a slantingly disposed baffle 64 is rigidly secured to the front wall 24 of container 23 and extends outwardly thereof into almost meeting relationship with the door 32 of jacket 19. The outer edge 65 is curved so as to conform with the inner contour of the jacket 19 and the side edges 66, 67 are coplanar with the side walls 26, 27 respectively of said container. Thus, when the container is inserted into the jacket and is releasably secured therein by the urgency of spring 41, the baffle 64 on container 23 acts as a downwardly slanting continuation of the horizontal fixed baffle 62.

To facilitate handling the container 23, there is provided a hole 68 in the baffle 64 which is preferably large enough to receive therethrough the fingers of the user. In addition, to providing a convenient means for handling the container 23, the baffle 64, being in engagement with the ambient air, is at a considerably lower temperature than the container 23 itself and thus prevents the hand of the user from being injured by the extreme coldness of the Dry Ice.

Disposed under the fixed baffle 62 is another fixed baffle 70 which is provided with one edge 71 alongside the lower side edge 67 of baffle 64. Baffle 70 extends around the interior of the jacket 19 a distance somewhat less than the peripheral extent of the container 23 and terminates in an edge 72 at right angles to the rear wall 25 of container 23.

A plurality of openings or slots 75 are provided in the lateral walls of jacket 19 to permit escape of air from the interior of the jacket to the passenger compartment. These slots are positioned adjacent the bottom 22 of the conditioner so that only air which encircled the container 23 about one and one half times is permitted to escape from the jacket. To enhance the contact of the air with the sidewalls 24—27 of the container 23 a suitable number of vertically extending baffles 76 are provided for directing the air inwardly of the jacket 19 against the sides of the container.

The bottom 22 may be provided with a drain 78 provided with a conduit 79 for conducting any condensed water from the interior of the conditioner through the firewall 1.

The detailed description herein given is not to be taken as restrictive of the invention as it is obvious that various modifications will occur to those skilled in the art without departing from the spirit of the invention.

I claim:

1. An air conditioner comprising a Dry Ice container having sidewalls, a bottom and a top, a jacket enclosing said container having lateral walls spaced outwardly of said sidewalls to form a space between said container and said jacket, inlet and outlet openings in said lateral walls for air, an opening in said lateral walls for horizontal insertion and withdrawal of said container therethrough into and out of said jacket, means for circulating air through said inlet and said space and out of said outlet whereby heat from said air is absorbed by said container, baffle means carried by said jacket and extending into said space for insuring movement of said air around the periphery of said container before discharging through said outlet, a baffle carried by said container and extending outwardly across said space toward said opening and adapted to be manually grasped to facilitate insertion and withdrawal of said container.

2. An air conditioner comprising a Dry Ice container having sidewalls, a bottom and a top, a jacket enclosing said container having lateral walls spaced outwardly of said sidewalls to form a space between said container and said jacket, inlet and outlet openings in said lateral walls for air, an opening in said lateral walls for horizontal insertion and withdrawal of said container therethrough into and out of said jacket, means for circulating air through said inlet and said space and out of said outlet whereby heat from said air is absorbed by said container, baffle means carried by said jacket and extending into said space for insuring movement of said air around the periphery of said container before discharging through said outlet, a baffle carried by said container and extending outwardly across said space toward said opening and adapted to be manually grasped to facilitate insertion and withdrawal of said container, said baffle conforming along its outer edge to the internal contour of said lateral walls and cooperating with said baffle means for guiding said air.

3. An air conditioner comprising a Dry Ice container having sidewalls, a bottom and a top, a jacket enclosing said container having lateral walls spaced outwardly of said sidewalls to form a space between said container and said jacket, inlet and outlet openings in said lateral walls for air, an opening in said lateral walls for insertion and withdrawal of said container therethrough into and out of said jacket, means for circulating air through said inlet and said space and out of said outlet whereby heat from said air is absorbed by said container, said container being open at said top for insertion of Dry Ice therein, and said jacket being provided with a cover, sealing means carried by said cover for sealing said top against escape of vapor from said container into said space, said sealing means including a gasket carried by said cover and engageable by said top, and spring means for urging said top into sealing engagement with said gasket.

4. An air conditioner comprising a Dry Ice container having sidewalls, a bottom and a top, a jacket enclosing said container having lateral walls spaced outwardly of said sidewalls to form a space between said container and said jacket, inlet and outlet openings in said lateral walls for air, an opening in said lateral walls for insertion and withdrawal of said container therethrough into and out of said jacket, means for circulating air through said inlet and said space and out of said outlet whereby heat from said air is absorbed by said container, said container being open at said top for insertion of Dry Ice therein, and said jacket being provided with a cover, sealing means carried by said cover for sealing said top against escape of vapor from said container into said space, a vent carried by said cover for removing vapor from said container when the latter is so sealed, a conduit for conducting said vapor from said vent, said vent including a check valve for permitting the escape of vapor from said container only when the vapor pressure within said container exceeds a predetermined amount.

References Cited in the file of this patent

UNITED STATES PATENTS

| | | |
|---|---|---|
| 2,082,501 | Lovely | June 1, 1937 |
| 2,083,607 | Joseph | June 15, 1937 |
| 2,097,556 | Bixby | Nov. 2, 1937 |
| 2,134,881 | Mitchell | Nov. 1, 1938 |
| 2,142,895 | Hanson | Jan. 3, 1939 |
| 2,186,562 | Sperry | Jan. 9, 1940 |
| 2,196,310 | Kalin | Apr. 9, 1940 |
| 2,444,416 | Bergman | July 6, 1948 |